Aug. 9, 1927.
J. JUNKUNC
TIRE LOCK
Filed Oct. 31, 1925
1,638,264
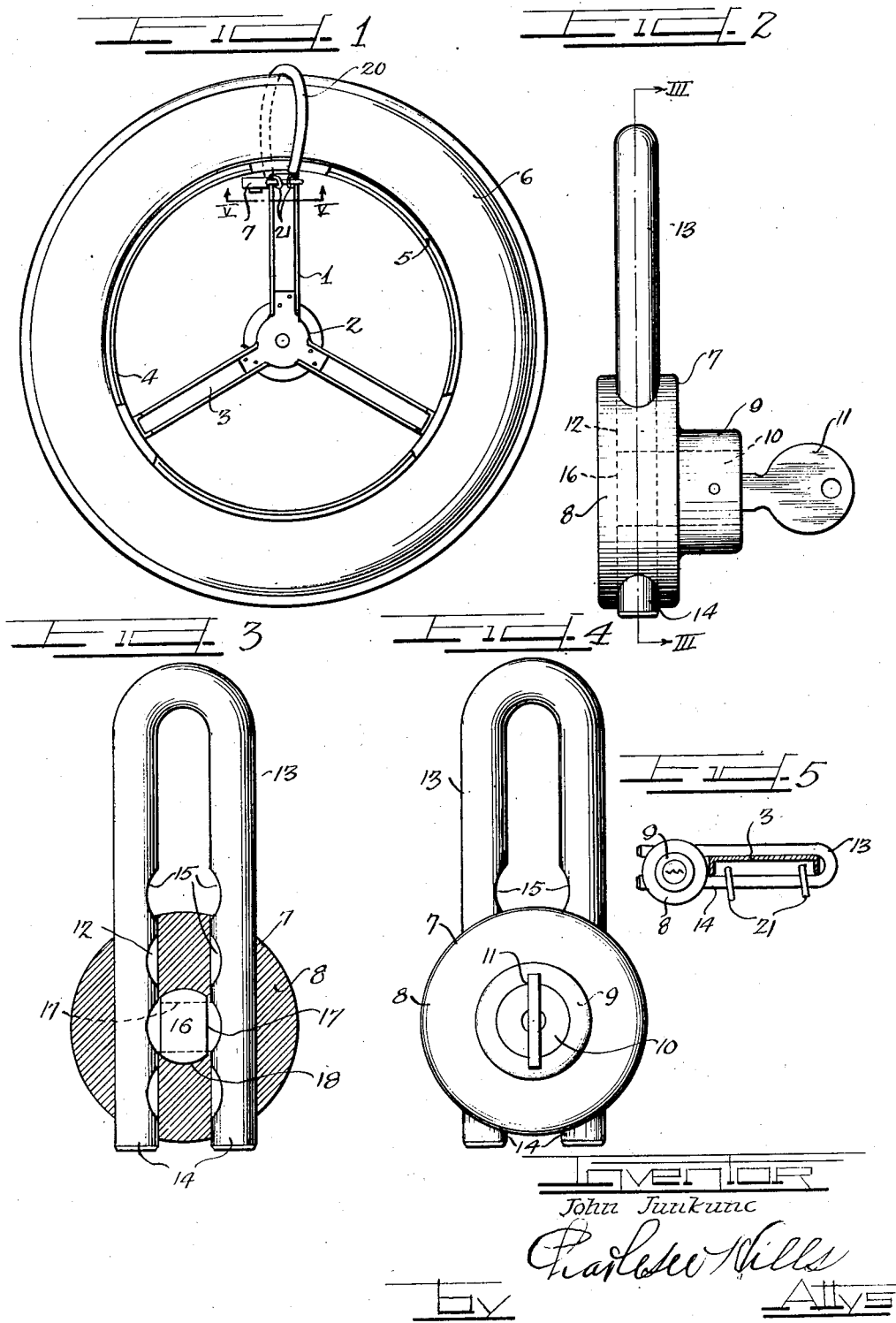
INVENTOR
John Junkunc
BY Charles W. Hills
ATTYS Patented Aug. 9, 1927.

1,638,264

UNITED STATES PATENT OFFICE.

JOHN JUNKUNC, OF CHICAGO, ILLINOIS.

TIRE LOCK.

Application filed October 31, 1925. Serial No. 65,903.

This invention relates to a lock and more particularly to a lock adapted for use in locking spare tires of automobiles.

It is an object of this invention to provide a lock having an elongated, detachable hasp adapted to be adjusted into various positions, whereby the effective length of said hasp may be varied to clampingly engage the object to which it is locked.

It is a further object of this invention to provide a lock of the general pin type having an elongated, detachable hasp adapted to be inserted into the body of the lock from either direction and to be adjusted into any one of a plurality of positions and there locked by means of a revolving bolt engaging directly with the hasp.

Other and further important objects of this invention will be apparent from the disclosures in the specification and accompanying drawings.

The invention (in a preferred form) is illustrated in the accompanying drawings and hereinafter more fully described.

On the drawings:

Figure 1 is an elevational view of a spare tire and carrier secured thereto by means of a chain and a lock embodying the principles of this invention.

Figure 2 is a side elevational view of my locking device.

Figure 3 is a sectional view taken on line III—III of Figure 2 showing the hasp in elevation and the operation of the lock.

Figure 4 is a front elevational view.

Figure 5 is a sectional view taken on line V—V of Figure 1, showing the lock in elevation.

As shown on the drawings:

The reference numeral 1 indicates a spare tire carrier of a type most commonly used on the less expensive kinds of automobiles and it is here shown as comprising a hub 2 adapted to be secured to the carrier support (not shown) and having a plurality of spokes 3. Each of the spokes 3 is formed of channel material (Figure 5) and terminates in a rim 4 adapted to receive the demountable rim 5 of the spare tire 6. A locking device 7, embodying the principles of my invention, is especially adapted to be used with a tire carrier of the type described. Said locking device 7 comprises a body portion of barrel 8 having a centrally located boss 9 on the front face thereof, in which is mounted a locking mechanism 10. Said locking mechanism 10 is adapted to be operated by means of a key 11 and may be of any suitable type. The barrel 8 is provided with two parallel spaced passages 12 extending completely through said barrel at right angles to the axis thereof. An elongated hasp 13 is formed with legs 14 adapted to be received by said passages 12. The inner faces of the legs 14 are provided with a plurality of arcuate notches 15 at spaced intervals from the ends of said legs 14. When the lock is locked, said notches 15 are adapted to be engaged by a locking bolt 16 operated by the key 11. The locking bolt 16 is a cylinder having flattened parallel faces 17 to provide a clearance for the links 14 of the hasp when the lock is unlocked. Rotation of the key 11 into locking position causes the cylindrical faces 18 of the lock bolt 16 to enter into the notches 15. The hasp is thereafter prevented from relative movement by reason of the projection of the cylindrical portion 18 of the bolt 16 into said notches. It is obvious that the hasp may be inserted from either direction into the barrel 8 and further that the hasp may be adjustably locked in any one of a number of positions.

In using a locking device of this type with a spare tire carrier such as described, the hasp 13 is first passed over one of the spokes 3, the spacing of the links 14 of the hasp being just sufficient to enclose the flanged edges to receive the flanged edges of the bolt. A chain 20 of suitable construction is adapted to be passed around the tire 6 with its two ends 21 threaded over one link of the hasp 13 between the flanges of the spoke 3. The barrel 8 is next threaded onto the ends of the hasp 13 and pushed up against the adjacent flange of the spoke as tightly as possible and there locked in position. The lock will be held tightly against the spoke so that it will not rattle. Furthermore, if the link of the chain 20 is correctly proportioned the lock may be positioned tight up against the face of the rim 4 thereby making it not only very unobtrusive but also comparatively inaccessible for tampering.

The lock itself is of especially sturdy construction and the positive engagement of the locking bolt with the hasp itself makes a very safe proposition.

I am aware that many changes may be made and numerous details of construction may be varied through a wide range without departing from the principles of the invention, and I therefore do not purpose limiting the patent granted hereon otherwise than necessitated by he prior art.

I claim as my invention:

1. A lock for use with a chain for locking spare tires to a tire carrier of the type having a channel frame, comprising an elongated hasp having legs spaced apart by the depth of said channel frame, said legs having successive notches along their inner faces, the ends of said chain being adapted to be secured to one of the legs between the flanges of said channel frame, a member adapted to receive the ends of said legs and to be moved therealong into abutment with said channel frame and a revoluble bolt mounted in said member and adapted to be positively engaged with certain of said notches to hold said member in locked position on said hasp.

2. A lock of the class described comprising a barrel having a plurality of spaced passages therein, a hasp adapted to be inserted in said passages and having notches therein, and a cylindrical locking bolt having flattened parallel faces and adapted to be rotated into locking engagement with said notches.

In testimony whereof I have hereunto subscribed my name.

JOHN JUNKUNC.